US012669193B2

(12) United States Patent
Determan et al.

(10) Patent No.: US 12,669,193 B2
(45) Date of Patent: Jun. 30, 2026

(54) VALVE WITH IMPROVED MAGNETIC FLUX INTERFACE

(71) Applicant: ASCO, L.P., Florham Park, NJ (US)

(72) Inventors: Alexander R. Determan, Grand Blanc, MI (US); Matthew Tyler Hoskins, Oak Park, MI (US); James R. Ward, Sturgis, MI (US)

(73) Assignee: ASCO, L.P., Florham Park, NJ (US)

( * ) Notice: Subject to any disclaimer, the term of this patent is extended or adjusted under 35 U.S.C. 154(b) by 191 days.

(21) Appl. No.: 18/590,944

(22) Filed: Feb. 29, 2024

(65) Prior Publication Data

US 2025/0277541 A1 Sep. 4, 2025

(51) Int. Cl.
| | |
|---|---|
| *F16K 31/06* | (2006.01) |
| *H01F 7/08* | (2006.01) |
| *H01F 7/16* | (2006.01) |
| *F16K 1/36* | (2006.01) |
| *F16K 27/02* | (2006.01) |

(52) U.S. Cl.
CPC ...... *F16K 31/0675* (2013.01); *F16K 31/0613* (2013.01); *H01F 7/081* (2013.01); *H01F 7/1607* (2013.01); *F16K 1/36* (2013.01); *F16K 27/0263* (2013.01); *F16K 27/029* (2013.01); *F16K 31/0624* (2013.01); *F16K 31/0658* (2013.01); *H01F 7/16* (2013.01)

(58) Field of Classification Search
CPC ............. F16K 31/0675; F16K 31/0613; F16K 31/0658; F16K 31/0624; F16K 27/029; F16K 27/0263; F16K 1/36; H01F 7/081; H01F 7/1607; H01F 7/16

USPC ........................................ 251/129.15, 129.09
See application file for complete search history.

(56) References Cited

U.S. PATENT DOCUMENTS

| | | | |
|---|---|---|---|
| 4,074,700 A | 2/1978 | Engle | |
| 4,530,486 A | 7/1985 | Rusnak | |
| 4,535,519 A | 8/1985 | Kajikawa et al. | |
| 4,552,179 A * | 11/1985 | Tarusawa ............ F16K 31/0627 |
| | | | 137/625.65 |
| 4,863,142 A | 9/1989 | Hendrixon et al. | |
| 4,919,390 A | 4/1990 | Ichiryu et al. | |
| 5,897,098 A | 4/1999 | Nishinosono et al. | |
| 5,918,635 A | 7/1999 | Wang et al. | |
| 5,996,628 A | 12/1999 | Najmolhoda et al. | |
| 6,546,959 B2 | 4/2003 | Cross et al. | |

(Continued)

OTHER PUBLICATIONS

Drawing LHDA0571215H, Rev. A, Title: HDI-FMT-QT-3W-5V-15PSI-FKM, The Lee Company, Nov. 1, 2010.

(Continued)

*Primary Examiner* — Minh Q Le
(74) *Attorney, Agent, or Firm* — Mackey Law Firm PLLC

(57) ABSTRACT

A valve can include a valve body, a plunger within the valve body, and a flux collar coupled to the valve body. A distance between the flux collar and the plunger can vary around an inner perimeter of the flux collar. A port section, a flux collar support section, and a coil support section of the valve body can be a unitary structure, such as an injection molded structure. The flux collar support section of the valve body can include an annular wall and/or a plurality of longitudinal ribs. The inner perimeter of the flux collar can be an annular inner wall and/or can have a plurality of longitudinal grooves spaced to receive the ribs.

20 Claims, 5 Drawing Sheets

(56) References Cited

U.S. PATENT DOCUMENTS

| | | | |
|---|---|---|---|
| 6,669,166 B2 | 12/2003 | Enomoto et al. | |
| 6,745,790 B2 | 6/2004 | Sato et al. | |
| 6,749,175 B2 | 6/2004 | Sato et al. | |
| 6,932,320 B2 | 8/2005 | Fukano et al. | |
| 7,106,158 B2* | 9/2006 | Forsythe | F16K 31/0655 |
| | | | 335/220 |
| 7,369,023 B2 | 5/2008 | Frank et al. | |
| 7,458,395 B2 | 12/2008 | Haynes et al. | |
| 7,468,647 B2* | 12/2008 | Ishibashi | F16K 31/0613 |
| | | | 335/220 |
| 7,766,037 B2 | 8/2010 | Moenkhaus et al. | |
| 8,109,487 B2 | 2/2012 | Kokubu et al. | |
| 8,261,424 B1 | 9/2012 | Thomeczek et al. | |
| 8,576,032 B2 | 11/2013 | Herbert et al. | |
| 8,651,141 B2 | 2/2014 | Giacomini et al. | |
| 8,991,435 B2 | 3/2015 | Schulz et al. | |
| 9,016,663 B2 | 4/2015 | Moreno et al. | |
| 9,195,229 B2 | 11/2015 | Stokes et al. | |
| 9,371,933 B2 | 6/2016 | Nitta | |
| 9,631,736 B2 | 4/2017 | Kus et al. | |
| 9,903,498 B2 | 2/2018 | Takanishi et al. | |
| 10,125,890 B2 | 11/2018 | Bahr | |
| 10,388,446 B2 | 8/2019 | Ott | |
| 10,895,330 B2 | 1/2021 | Hausser | |
| 11,110,904 B2 | 9/2021 | Dinerman et al. | |
| 11,137,086 B2 | 10/2021 | Chang | |
| 11,215,293 B2 | 1/2022 | Fukuda et al. | |
| 11,293,564 B2 | 4/2022 | Hoskins et al. | |
| 11,788,629 B2 | 10/2023 | Bezold et al. | |
| 11,885,430 B2 | 1/2024 | Roche et al. | |
| 12,241,558 B2 | 3/2025 | Favreau | |
| 2001/0037832 A1 | 11/2001 | Weiss et al. | |
| 2002/0000530 A1 | 1/2002 | Kumar | |
| 2002/0079004 A1 | 6/2002 | Sato et al. | |
| 2003/0189183 A1* | 10/2003 | Noller | H01F 41/04 |
| | | | 251/129.21 |
| 2004/0163721 A1* | 8/2004 | Cotton, III | F16K 31/0606 |
| | | | 137/625.65 |
| 2005/0051749 A1* | 3/2005 | Lee | F16K 31/0665 |
| | | | 251/129.15 |
| 2005/0269538 A1 | 12/2005 | Haynes et al. | |
| 2006/0108551 A1* | 5/2006 | Yoshimura | F16K 31/0655 |
| | | | 251/129.15 |
| 2009/0039302 A1 | 2/2009 | Giacomini et al. | |
| 2010/0155638 A1 | 6/2010 | Zurke | |
| 2010/0326552 A1 | 12/2010 | Suzuki et al. | |
| 2012/0326065 A1 | 12/2012 | Ferguson et al. | |
| 2013/0146796 A1* | 6/2013 | Karl | F16K 31/0655 |
| | | | 251/129.15 |
| 2013/0264507 A1 | 10/2013 | Schnelker et al. | |
| 2013/0284960 A1 | 10/2013 | Schnelker et al. | |
| 2014/0175312 A1 | 6/2014 | Jamison et al. | |
| 2015/0102243 A1 | 4/2015 | Timmermans et al. | |
| 2017/0146148 A1 | 5/2017 | Kim et al. | |
| 2018/0056954 A1 | 3/2018 | Kollmann et al. | |
| 2019/0108934 A1* | 4/2019 | Nagasaki | F16K 11/07 |
| 2020/0114479 A1 | 4/2020 | Ueno | |
| 2020/0208753 A1 | 7/2020 | Hoppe | |
| 2020/0240536 A1 | 7/2020 | Williams et al. | |
| 2021/0327626 A1* | 10/2021 | Sasao | H01F 7/081 |
| 2022/0003332 A1 | 1/2022 | Roche et al. | |
| 2022/0042619 A1 | 2/2022 | Bailey et al. | |
| 2022/0221073 A1 | 7/2022 | Favreau | |
| 2022/0325816 A1 | 10/2022 | Sadiku et al. | |
| 2023/0125219 A1 | 4/2023 | Di Dio et al. | |

OTHER PUBLICATIONS

Drawing LHDA0581215H, Rev. A, Title: HDI-PTD-QT-3W-5V-15PSI-FKM, The Lee Company, Nov. 1, 2010.

Drawing LHDA0561215H, Rev. A, Title: HDI-PI-QT-3W-15 PSI-FKM, The Lee Company, Nov. 1, 2010.

ASCO General Service Solenoid Valves, 2/2 Series 210 brochure, Jan. 20, 2022.

BV10, Mac Valves Product Brochure, (https://www.macvalves.com), 2024.

LHD Series 3-Way Control Solenoid Valve, The Lee Company (https://www.theleeco.com/product/lhd-series-3-way-control-solenoid-valve/), 2024.

100411603 B2, Aug. 7, 2018, Boban.

* cited by examiner

VALVE WITH IMPROVED MAGNETIC FLUX INTERFACE

CROSS-REFERENCE TO RELATED APPLICATIONS

This application is related to the commonly owned applications entitled "SOLENOID VALVE WITH BARBED SEALING ASSEMBLY," "SOLENOID PLUNGER ALIGNMENT," "SOLENOID VALVE POPPET AFFIXMENT," and "PRESS TO SPECIFICATION SOLENOID VALVE ASSEMBLY," respectively, each filed on the same day as the instant application, and the contents of which are incorporated herein by reference.

BACKGROUND OF THE INVENTION

Field of the Invention

The present disclosure relates generally to solenoid valves and more specifically relates to miniature solenoid valves.

Description of the Related Art

Fundamentally, all electromagnetic solenoid devices turn electrical energy into mechanical work. One of the characteristics that defines how efficient a solenoid is at converting electrical energy into mechanical work is the series magnetic airgap within the solenoid. Reducing the series magnetic airgap increases the efficiency of the system. Many solenoids have some sort of flux collar or soft magnetic pathway to reduce the series magnetic airgap within the solenoid. However, conventional designs have limits.

SUMMARY OF THE INVENTION

Applicants have created new and useful devices, systems and methods for solenoid valves. In at least one embodiment, the series magnetic airgap can be minimized by thinning and/or eliminating a wall section between a flux collar and a plunger of the solenoid valve. In at least one embodiment, the series magnetic airgap can be minimized while the valve body, including that section between the flux collar and the plunger, nonetheless remains strong enough to sufficiently resist bending and axial loading during assembly and operation of the valve. In at least one embodiment, the series magnetic airgap can be minimized while the valve body, including that section between the flux collar and the plunger, nonetheless remains strong enough to sufficiently resist the pressure of media within the valve and/or is capable of being formed via injection molding (e.g., of plastic). In at least one embodiment, the series magnetic airgap can be minimized and the valve body, such as the section between the flux collar and the plunger, can be advantageously configured for supporting formation via injection molding and avoiding constrictions that can be problematic during the injection molding process.

In at least one embodiment, a valve can include a valve body, a plunger within the valve body, a flux collar coupled to the valve body, or any combination thereof. In at least one embodiment, a distance between the flux collar and the plunger can vary around an inner perimeter of the flux collar. In at least one embodiment, the valve body can include a port section, a flux collar support section, and a coil support section extending along a longitudinal axis. In at least one embodiment, the port section, the flux collar support section, and the coil support section of the valve body can be or include a single structure, such as a unitary or monolithic injection molded structure.

In at least one embodiment, the plunger can extend at least partially through the flux collar support section and the coil support section. In at least one embodiment, the flux collar can be coupled to the flux collar support section of the valve body. In at least one embodiment, the plunger can extend at least partially through the flux collar.

In at least one embodiment, the flux collar support section of the valve body can include an annular wall and/or a plurality of longitudinal ribs. In at least one embodiment, the ribs can extend outwardly from the annular wall of the flux collar support section of the valve body. In at least one embodiment, the inner perimeter of the flux collar can be an annular inner wall and/or can have a plurality of longitudinal grooves spaced to receive the ribs.

In at least one embodiment, the flux collar can be a multi-section ring. In at least one embodiment, each section of the flux collar can have at least one longitudinal groove configured to receive one of the ribs. For example, the flux collar can be a two-section ring. In at least one embodiment, the sections of the flux collar can interface along a plane. In at least one embodiment, the ribs can extend from the annular wall of the flux collar support section of the valve body, such as along one or more axes perpendicular to the plane.

In at least one embodiment, the flux collar support section of the valve body can have an annular inner wall and an outer wall. In at least one embodiment, the outer wall of the flux collar support section can have one or more flat sides and/or one or more lobes. In at least one embodiment, the inner perimeter of the flux collar can be an inner wall having at least two flat sides corresponding to the flat sides of the outer wall of the flux collar support section of the valve body. In at least one embodiment, the inner perimeter of the flux collar can be an inner wall having a contour corresponding to, or matching, the outer wall of the flux collar support section of the valve body.

In at least one embodiment, the flux collar support section of the valve body can have a plurality of longitudinal ribs, with or without an annular wall. In at least one embodiment, the inner perimeter of the flux collar can be an annular inner wall having a plurality of longitudinal grooves spaced to receive the ribs. In at least one embodiment, the inner wall of the flux collar can be flush with an inner wall of the coil support section of the valve body.

In at least one embodiment, the coil support section of the valve body includes an annular wall having a constant thickness. In at least one embodiment, the flux collar support section of the valve body includes an annular wall having a variable thickness, which can vary around the wall. In at least one embodiment, the variable thickness of the flux collar support section can be less than the constant thickness of the coil support section around at least a portion of the flux collar support section of the valve body.

In at least one embodiment, the flux collar support section of the valve body can have a variable thickness, that varies around the flux collar support section of the valve body. In at least one embodiment, the coil support section of the valve body can have a constant thickness. In at least one embodiment, the variable thickness of the flux collar support section of the valve body can be thinner than the constant thickness of the coil support section of the valve body around at least a portion of the flux collar support section. In at least one embodiment, the variable thickness of the flux collar support section of the valve body can be thicker than the constant thickness of the coil support section of the valve body around at least a portion of the flux collar support section.

In at least one embodiment, valve body can include a port section, a flux collar support section, and a coil support section extending along a longitudinal axis. In at least one embodiment, the port section, the flux collar support section, and the coil support section of the valve body can be or include a unitary structure, such as an integrally formed, injection molded structure. In at least one embodiment, the flux collar support section of the valve body can have a variable thickness, that varies around the flux collar support section of the valve body.

In at least one embodiment, the coil support section of the valve body can have a constant thickness around the coil support section of the valve body. In at least one embodiment, the variable thickness of the flux collar support section of the valve body can be thinner than the thickness of the coil support section of the valve body around at least a portion of the flux collar support section. In at least one embodiment, the variable thickness of the flux collar support section of the valve body can be thicker than the thickness of the coil support section of the valve body around at least a portion of the flux collar support section.

DETAILED DESCRIPTION OF THE INVENTION

Figure 1:
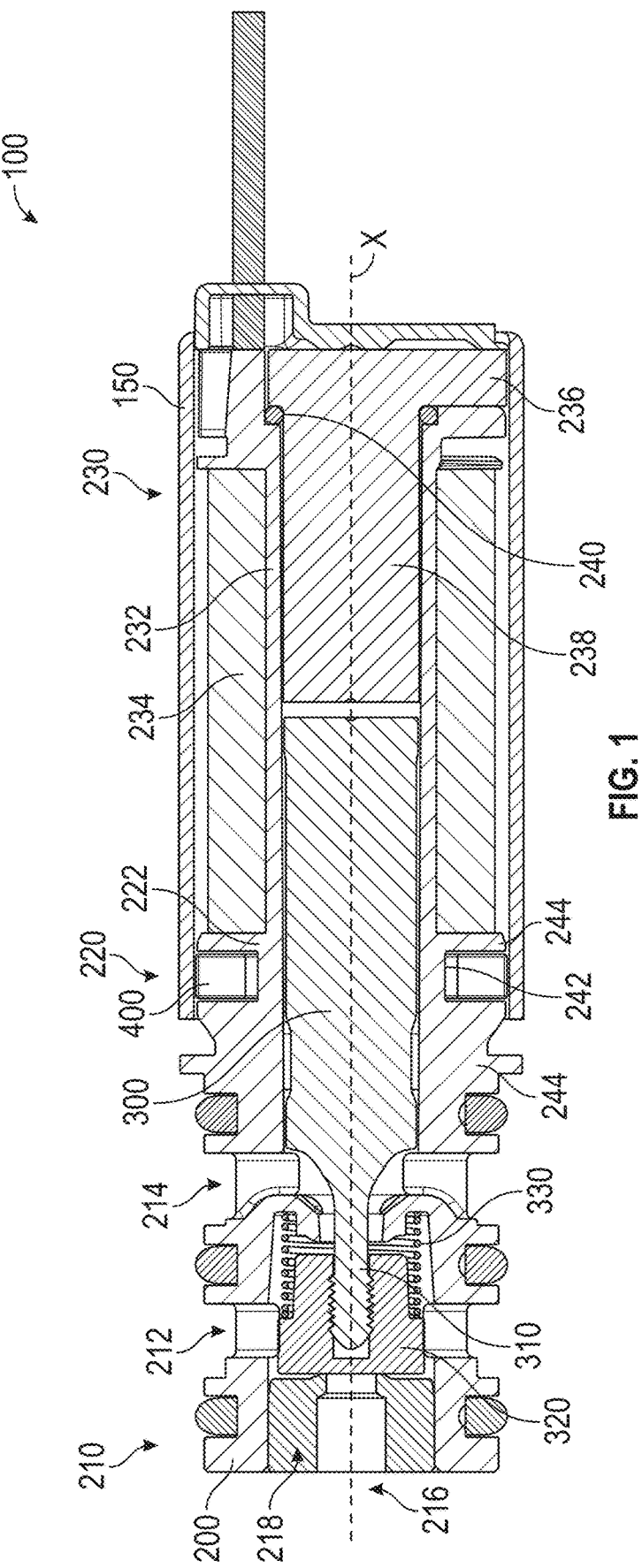
FIG. 1 is a sectional view of one of many embodiments of a solenoid valve according to the disclosure.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Any process flowcharts discussed herein illustrate the operation of possible implementations of systems, methods, and computer program products according to various embodiments of the present disclosure. In this regard, each block in a flowchart may represent a module, segment, or portion of code, which can comprise one or more executable instructions for implementing the specified logical function(s). It should also be noted that, in some implementations, the function(s) noted in the block(s) might occur out of the order depicted in the figures. For example, blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Applicants have created new and useful devices, systems and methods for solenoid valves, such as miniature solenoid valves. Once again, reducing the series magnetic airgap of a solenoid valve can increase the efficiency of the valve. In at least one embodiment, the series magnetic airgap can be minimized by thinning and/or eliminating a wall section between a flux collar and a plunger of the solenoid valve. In at least one embodiment, the series magnetic airgap can be minimized while the valve body, including that section between the flux collar and the plunger, nonetheless remains strong enough to sufficiently resist bending and axial loading during assembly and operation of the valve. In at least one embodiment, the series magnetic airgap can be minimized while the valve body, including that section between the flux collar and the plunger, nonetheless remains strong enough to sufficiently resist the pressure of media within the valve and/or is capable of being formed via injection molding (e.g., of plastic). In at least one embodiment, the series magnetic airgap can be minimized and the valve body, such as the section between the flux collar and the plunger, can be advantageously configured for supporting formation via injection molding and avoiding constrictions that can be problematic during the injection molding process.

In at least one embodiment, the valve body, such as the section between the flux collar and the plunger, can include a wall having a set of ribs, such as a plurality of longitudinal ribs, equally or otherwise spaced about the circumference or perimetry thereof. In at least one embodiment, the ribs can increase the moment of inertia in a wall or wall section for providing strength to the valve body for resisting applicable loads while simultaneously providing for a relatively small series magnetic airgap between the flux collar and the plunger. In at least one embodiment, one or more ribs can be advantageously configured for supporting sufficient material flow during injection molding, i.e., to sufficiently fill the valve body mold during manufacturing. In at least one embodiment, one or more ribs can be advantageously configured for allowing thinner wall sections in at least a portion of the valve body versus conventional valve bodies, thereby allowing for the flux collar to be closer in position to the plunger of the solenoid, minimizing the average airgap, and increasing efficiency of the solenoid.

Figure 2:
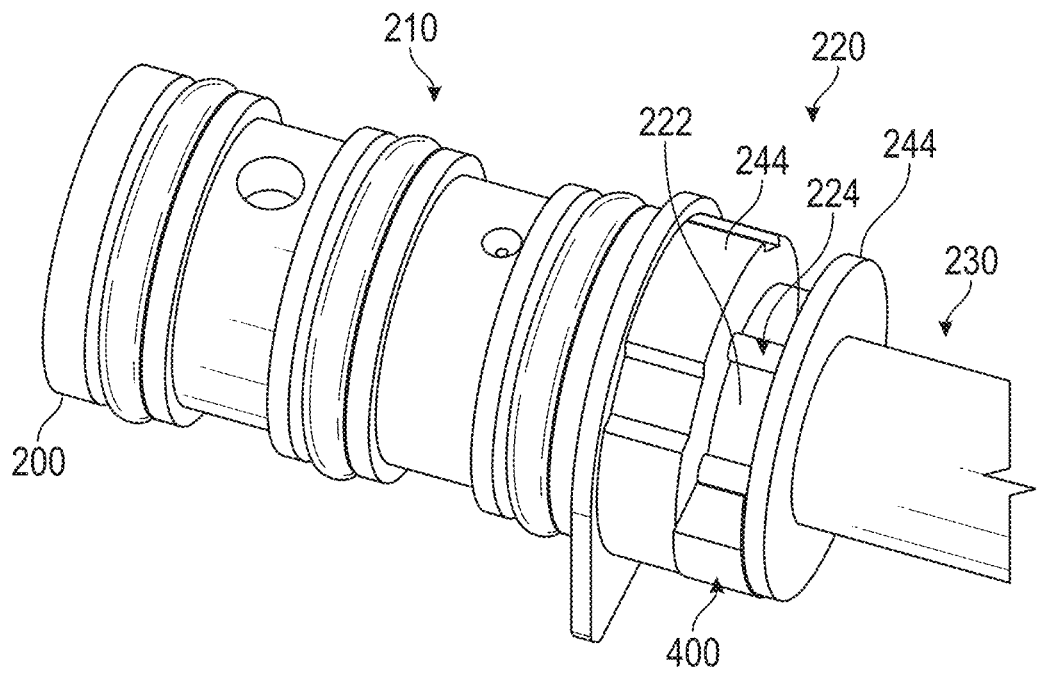
FIG. 2 is a partial perspective view of one of many embodiments of a valve body according to the disclosure.
Figure 3:
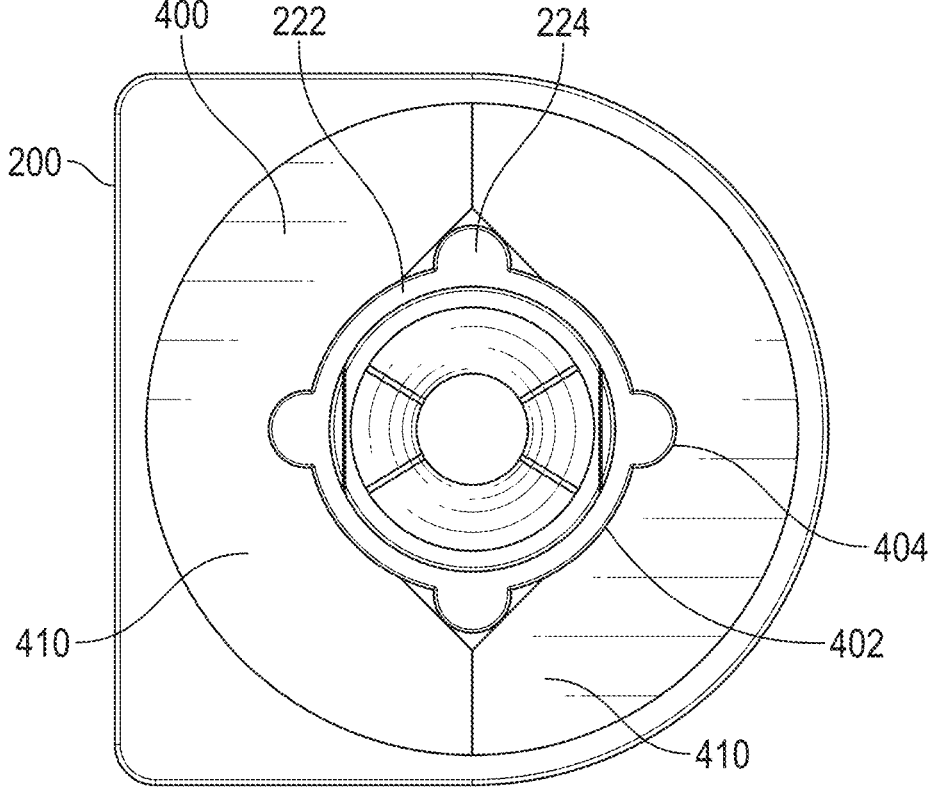
FIG. 3 is a cross-sectional view of one of many embodiments of a solenoid valve having a flux collar according to the disclosure.
Figure 4:
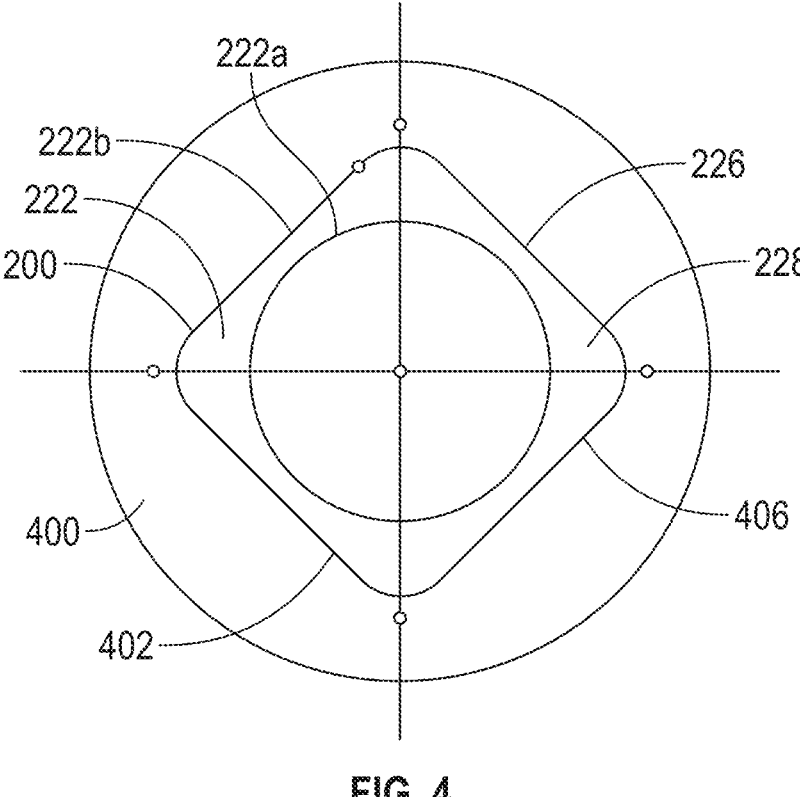
FIG. 4 is a cross-sectional view of another one of many embodiments of a solenoid valve having a flux collar according to the disclosure.
Figure 5:
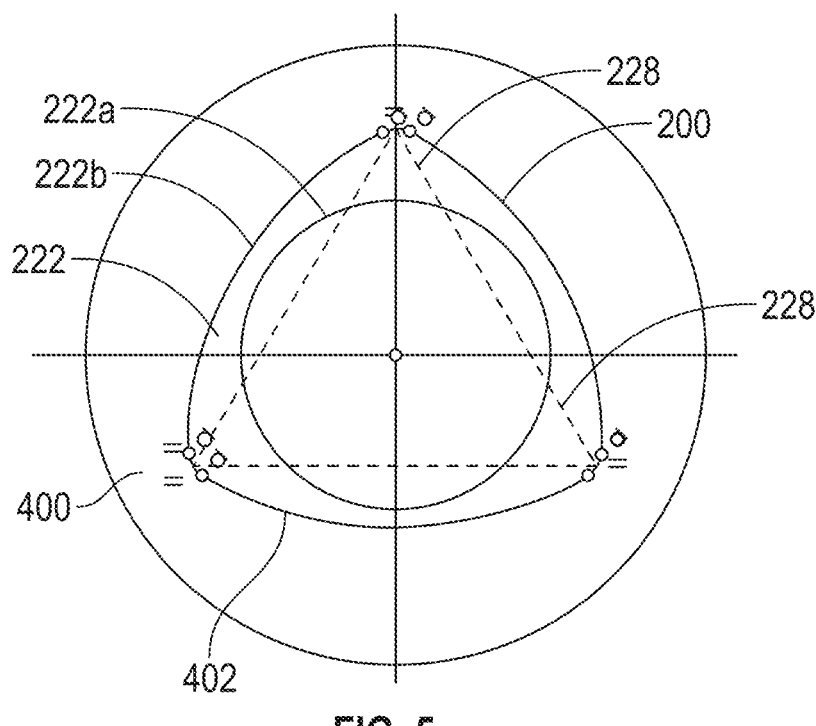
FIG. 5 is a cross-sectional view of yet another one of many embodiments of a solenoid valve having a flux collar according to the disclosure.
Figure 6:
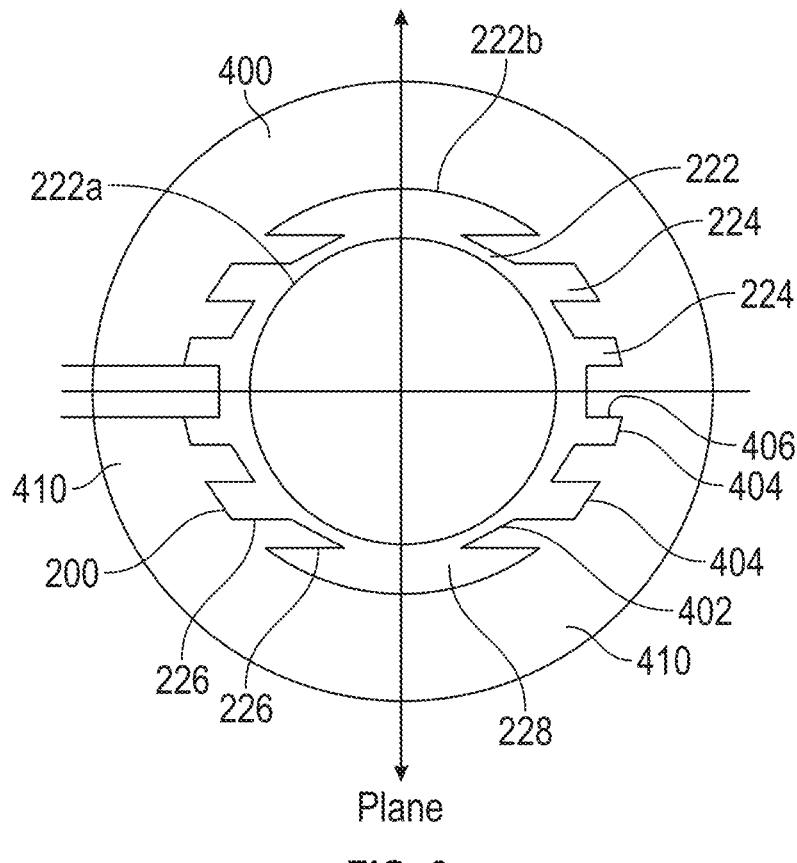
FIG. 6 is a cross-sectional view of still another one of many embodiments of a solenoid valve having a flux collar according to the disclosure.
Figure 7:
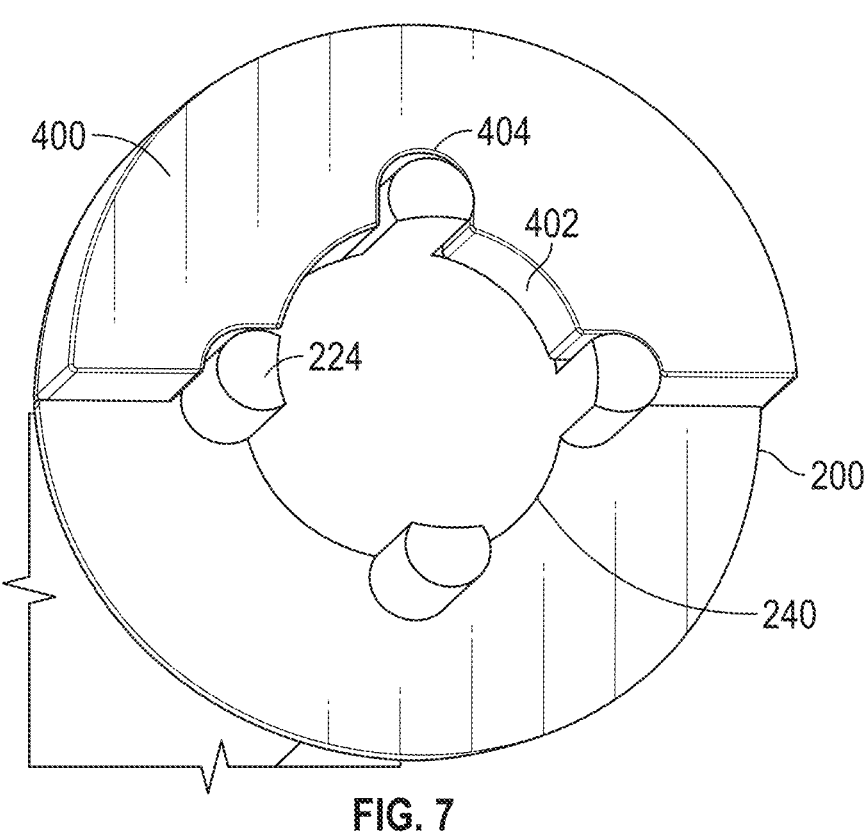
FIG. 7 is a perspective view of one of many embodiments of a valve body having a flux collar according to the disclosure.
Figure 8:
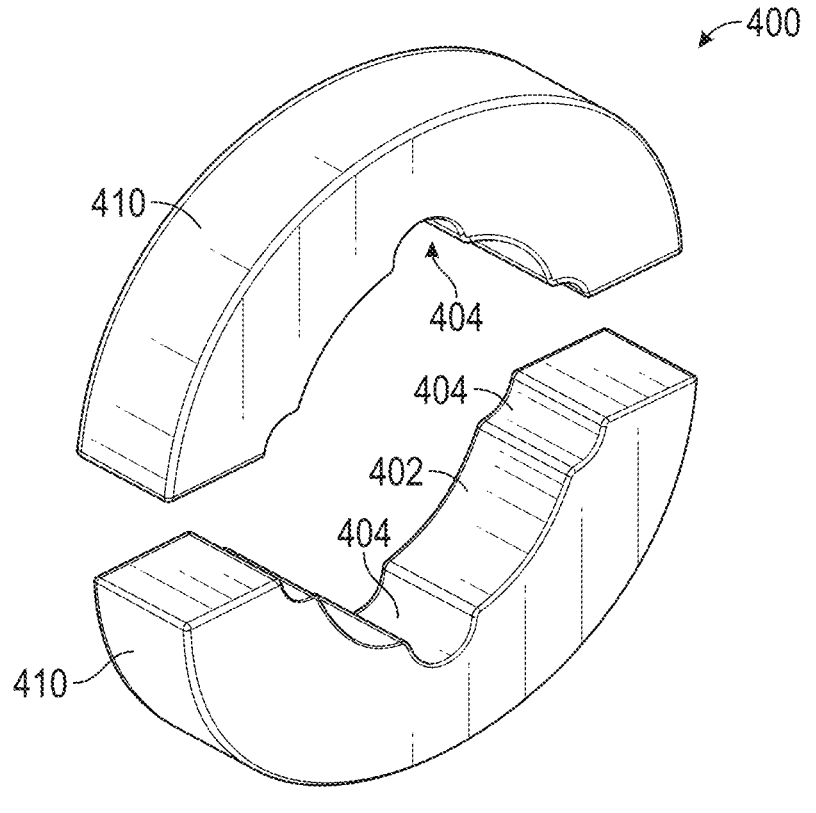
FIG. 8 is a perspective view of one of many embodiments of a flux collar according to the disclosure.

FIG. 1 is a sectional view of one of many embodiments of a solenoid valve according to the disclosure. FIG. 2 is a partial perspective view of one of many embodiments of a valve body according to the disclosure. FIG. 3 is a cross-sectional view of one of many embodiments of a solenoid valve having a flux collar according to the disclosure. FIG. 4 is a cross-sectional view of another one of many embodiments of a solenoid valve having a flux collar according to the disclosure. FIG. 5 is a cross-sectional view of yet another one of many embodiments of a solenoid valve having a flux collar according to the disclosure. FIG. 6 is a cross-sectional view of still another one of many embodiments of a solenoid valve having a flux collar according to the disclosure. FIG. 7 is a perspective view of one of many embodiments of a valve body having a flux collar according to the disclosure. FIG. 8 is a perspective view of one of many embodiments of a flux collar according to the disclosure. FIGS. 1-8 are described in conjunction with one another.

In at least one embodiment, a valve 100 according to the disclosure, such as a miniature solenoid valve, can include one or more valve bodies 200, one or more plungers 300 disposed at least partially within the valve body 200, and one or more flux collars 400 configured to be coupled to the valve body 200 for supporting operation of the valve. In at least one embodiment, a valve 100 can include a shell 150 for housing or protecting one or more other components of the valve. In at least one embodiment, a distance or gap between the flux collar 400 and the plunger 300 can vary along at least a portion of the valve body 200, such as around or about an inner perimeter or perimetry of the flux collar 400. In at least one embodiment, a wall thickness of at least a portion of the valve body 200 can vary along at least a portion of the valve body 200, such as a portion disposed radially between an outer surface of the plunger 300 and an inner surface of the flux collar 400.

In at least one embodiment, the valve body 200 can include one or more port sections 210, one or more flux collar support sections 220, one or more coil support sections 230, or any combination thereof, extending along one or more axes, such as a central longitudinal axis X. In at least one embodiment, the port section 210, the flux collar support section 220, and the coil support section 230 of the valve body 200 can be unitary or monolithic, such as by way of being portions of an integrally formed structure (e.g., an injection molded structure). In at least one embodiment, the port section 210 can include one or more common ports 212, one or more normally open ports 214, one or more normally closed ports 216, or any combination thereof.

In at least one embodiment, the plunger 300 can extend at least partially through the flux collar support section 220 and the coil support section 230. In at least one embodiment, the plunger 300 can extend at least partially through the flux collar 400. In at least one embodiment, the plunger 300 can include one or more necks 310 that extend into the port section 210. In at least one embodiment, the plunger 300 can include one or more poppets 320 mounted to the neck 310. In at least one embodiment, one or more biasing members, such as a spring 330, can bias the plunger 300 and/or poppet 320 towards or away from one or more seats 218. In at least one embodiment, a poppet 320 can include a plurality of components, such as a poppet body and one or more seals or other components coupled thereto. In at least one embodiment, a poppet 320 can be a unitary or monolithic structure, such as, for example, a solid elastomer structure.

In at least one embodiment, the coil support section 230 of the valve body 200 can include one or more annular walls 232 and/or one or more coils 234. In at least one embodiment, the wall 232 can support coil 234, which can selectively actuate, or move, the plunger 300 against the force of the spring 330, to thereby switch the valve 100 from a normally open position to a normally closed position. In at least one embodiment, the coil support section 230 can include a core 238 and one or more stops 236 to limit the movement of the plunger 300 in one or more directions within the bore 240. As shown in FIG. 1 for illustrative purposes, in at least one embodiment, the stop 236 and the core 238 can be parts of a unitary structure, such as an injection molded structure. As another example, in at least one embodiment, the stop 236 and the core 238 can be two or more separate parts coupled to one another and/or to other components of valve 100 as needed or desired in accordance with an implementation of the disclosure.

In at least one embodiment, the flux collar 400 can be coupled to the flux collar support section 220 of the valve body 200, such as by way of being disposed about a wall or other portion of the flux collar support section 220. In at least one embodiment, the flux collar 400 can be disposed at least partially in a groove 242 of the flux collar support section 220, such as a groove 242 located between two or more retainers 244, such as walls, stops, collars or other structures. In at least one embodiment, the flux collar support section 220 of the valve body 200 can include one or more walls 222, such as an annular wall about a bore 240 in which plunger 300 may be disposed, and/or one or more ribs 224. In at least one embodiment, the ribs 224 can extend radially outwardly from the wall 222 of the flux collar support section 220 of the valve body 200, such as from an outside or exterior surface of the wall 222. In at least one embodiment, one or more of the ribs 224 can extend outwardly along an axis perpendicular to an exterior surface of the wall 222 of the flux collar support section 220 of the valve body 200. In at least one embodiment, the inner perimeter of the flux collar 400 can include one or more inner walls 402 and/or one or more longitudinal grooves 404 spaced to receive at least a portion of one or more of the ribs 224.

In at least one embodiment, the flux collar 400 can be or include a multi-section ring, such as a ring comprising a plurality of segments or other portions. In at least one embodiment, each section 410 of the flux collar 400 can have one or more longitudinal grooves 404 configured to receive or otherwise cooperate with at least a portion of one or more corresponding ribs 224. For example, in at least one embodiment, the flux collar 400 can be a two-section ring. In at least one embodiment, the sections 410 of the flux collar 400 can meet, separate, or otherwise interface at or along a plane. In at least one embodiment, the ribs 224 can extend from the wall 222 of the flux collar support section 220 of the valve body 200, such as radially outwardly or in a radially outward direction. In at least one embodiment, the ribs 224 can extend from the wall 222 of the flux collar support section 220 of the valve body 200 along one or more axes perpendicular to a plane at which two or more sections 410 of the flux collar 400 interface (which can, but need not, include contacting one another).

In at least one embodiment, the flux collar support section 220 of the valve body 200 can include a wall 222 having an annular inner wall or surface 222*a* and an outer wall or surface 222*b*. In at least one embodiment, the outer wall 222*b* of the flux collar support section 220 can have one or more at least partially flat or linear sides 226 (see, e.g., FIGS. 4 and 6). In at least one embodiment, the wall 222 of the flux collar support section 220 can include one or more lobes 228 (see, e.g., FIGS. 4-6). In at least one embodiment, the inner perimeter of the flux collar 400 can be an inner wall 402 having one or more at least partially flat or linear sides 406 corresponding to the sides 226 of the outer wall 222*b* of the flux collar support section 220 of the valve body 200. In at least one embodiment, the inner perimeter of the flux collar 400 can be an inner wall 402 having one or more contours or nonlinear portions corresponding to, or matching, the outer wall 222*b* of the flux collar support section 220 of the valve body 200.

In at least one embodiment, the flux collar support section 220 of the valve body 200 can have a plurality of longitudinal ribs 224 that form at least a portion of the interior surface of bore 240, whether separately or in combination with wall 222 or one or more sections or portions thereof, and the flux collar 400 can have an inner wall 402 with a plurality of longitudinal grooves 404 configured to receive at least a portion of corresponding ones of the ribs 224. For example, in at least one embodiment, such as a valve wherein at least a portion of the bore 240 is fluidically isolated from media flowing through the valve, one or more of the ribs 224 and the flux washer 400 can extend into or form a portion of the bore 240 (see, e.g., FIG. 7). In such an embodiment, which is but one of many, the inner wall 402 of the flux collar 400 can be (but need not be) flush with an inner wall of the bore 240, which can include being flush with an inner wall of the coil support section 230 of the valve body 200 or, for instance, being flush with an inner wall of the bore 240 along the flux collar support section 220.

In at least one embodiment, the coil support section 230 of the valve body 200 can include an annular wall 232 having a thickness, such as a constant thickness along a length of the coil support section 230. In at least one embodiment, the flux collar support section 220 of the valve body 200 can include an annular wall 222 having a variable thickness, such as a thickness that varies around or about the wall 222 (e.g., in a radial direction) and/or along a length of the flux collar support section 220. In at least one embodiment, at least a portion of the variable thickness of the wall 222 of the flux collar support section 220 (such as the major or minor thickness of the wall 222) can be less than the thickness of the coil support section 230 around or about at least a portion of the flux collar support section 220 of the valve body 200.

In at least one embodiment, a wall 222 of the flux collar support section 220 of the valve body 200 can have a variable thickness, which can vary around the flux collar support section 220 of the valve body 200. In at least one embodiment, the coil support section 230 of the valve body 200 can have a constant thickness. In at least one embodiment, a maximum thickness of the wall 222 of the flux collar support section 230 of the valve body 200 can be less than the thickness of the wall 232 of the coil support section 230 of the valve body 200 around at least a portion of the flux collar support section 220. In at least one embodiment, at least a portion of the variable thickness of the wall 222 of the flux collar support section 220 of the valve body 200 can be thicker than at least a portion of the thickness of the wall 232 of the coil support section 230 of the valve body 200, such as along at least a portion of the flux collar support section 220.

In at least one embodiment, valve body 200 can include one or more port sections 210, one or more flux collar support sections 220, one or more coil support sections 230, or any combination thereof. Two or more of the sections 210, 220, 230 can be disposed along or can extend along one or more axes, such as a longitudinal axis (e.g., a central longitudinal axis). In at least one embodiment, the port section 210, the flux collar support section 220, and the coil support section 230 of the valve body 200 can be portions of a single, unitary body, such as an injection molded body. In at least one embodiment, the flux collar support section 220 of the valve body 200 can have a variable thickness, such as a wall thickness that varies around or about at least a portion of the flux collar support section 220 of the valve body 200.

In at least one embodiment, the wall 232 of the bore 240 of the valve body 200 can have a constant thickness along at least a portion of the coil support section 230 of the valve body 200. In at least one embodiment, the variable thickness of the wall 222 of the bore 240 along the flux collar support section 220 of the valve body 200 can be thinner than the thickness of the wall 232 of the bore 240 along the coil support section 230 of the valve body 200, such as along at least a portion of the flux collar support section 220. In at least one embodiment, the variable thickness of the wall 222 of the bore 240 along the flux collar support section 220 of the valve body 200 can be thicker than the wall 232 of the bore 240 along the coil support section 230 of the valve body 200, such as around or about at least a portion of the flux collar support section 220.

In at least one embodiment, a valve can include a valve body, a plunger within the valve body, a flux collar coupled to the valve body, or any combination thereof. In at least one embodiment, a distance between the flux collar and the plunger can vary around an inner perimeter of the flux collar. In at least one embodiment, the valve body can include a port section, a flux collar support section, and a coil support section extending along a longitudinal axis. In at least one embodiment, the port section, the flux collar support section, and the coil support section of the valve body can be a single monolithic structure, such as by way of being portions of a unitary or integrally formed structure. In at least one embodiment, the port section, the flux collar support section, and the coil support section of the valve body can be injection molded, such as out of plastic or another moldable material.

In at least one embodiment, the plunger can extend at least partially through the flux collar support section and the coil support section. In at least one embodiment, the flux collar can be coupled to the flux collar support section of the valve body. In at least one embodiment, the plunger can extend at least partially through the flux collar.

In at least one embodiment, the flux collar support section of the valve body can include an annular wall and/or a plurality of longitudinal ribs. In at least one embodiment, the ribs can extend from the annular wall of the flux collar support section of the valve body. In at least one embodiment, the inner perimeter of the flux collar can be an annular inner wall and/or can have a plurality of longitudinal grooves spaced to receive the ribs.

In at least one embodiment, the flux collar can be a multi-section ring. In at least one embodiment, each section of the flux collar can have at least one longitudinal groove configured to receive one of the ribs. For example, the flux collar can be a two-section ring. In at least one embodiment, the sections of the flux collar can interface along a plane. In at least one embodiment, one or more of the ribs can extend from the annular wall of the flux collar support section of the valve body, such as in a direction perpendicular to the plane.

In at least one embodiment, the flux collar support section of the valve body can have an annular inner wall and an outer wall. In at least one embodiment, the outer wall of the flux collar support section can have one or more flat sides and/or one or more lobes, such as one or more lobes that extend radially outwardly relative to a longitudinal axis of the bore. In at least one embodiment, the inner perimeter of the flux collar can be an inner wall having at least two flat sides corresponding to the flat sides of the outer wall of the flux collar support section of the valve body. In at least one embodiment, the inner perimeter of the flux collar can be an inner wall having a contour corresponding to, or matching, the outer wall of the flux collar support section of the valve body.

In at least one embodiment, the flux collar support section of the valve body can have a plurality of longitudinal ribs, with or without an annular wall. In at least one embodiment, the inner perimeter of the flux collar can be an annular inner wall having a plurality of longitudinal grooves spaced to receive the ribs. In at least one embodiment, the inner wall of the flux collar can be annular and can be flush with an inner wall of the coil support section of the valve body.

In at least one embodiment, the coil support section of the valve body includes an annular wall having a constant thickness. In at least one embodiment, the flux collar support section of the valve body includes an annular wall having a variable thickness, which can vary around the wall. In at least one embodiment, the variable thickness of the flux collar support section can be less than the constant thickness of the coil support section around at least a portion of the flux collar support section of the valve body.

In at least one embodiment, the flux collar support section of the valve body can have a variable thickness, that varies around the flux collar support section of the valve body. In at least one embodiment, the coil support section of the valve body can have a constant thickness. In at least one embodiment, the variable thickness of the flux collar support section of the valve body can be thinner than the constant thickness of the coil support section of the valve body around at least a portion of the flux collar support section. In at least one embodiment, the variable thickness of the flux collar support section of the valve body can be thicker than the constant thickness of the coil support section of the valve body around at least a portion of the flux collar support section.

In at least one embodiment, valve body can include a port section, a flux collar support section, and a coil support section extending along a longitudinal axis, such as a central longitudinal axis or another axis. In at least one embodiment, the port section, the flux collar support section, and the coil support section of the valve body can be unitary. In at least one embodiment, the flux collar support section of the valve body can have a variable thickness, such as a wall thickness that varies around at least a portion of the flux collar support section of the valve body.

In at least one embodiment, the coil support section of the valve body can have a constant thickness around the coil support section of the valve body. In at least one embodiment, the variable thickness of the flux collar support section of the valve body can be thinner than the thickness of the coil support section of the valve body around at least a portion of the flux collar support section. In at least one embodiment, the variable thickness of the flux collar support section of the valve body can be thicker than the thickness of the coil support section of the valve body around at least a portion of the flux collar support section.

Other and further embodiments utilizing one or more aspects of the disclosure can be devised without departing from the spirit of Applicants' disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

The invention claimed is:

1. A valve comprising:
   a valve body having a port section, a flux collar support section, and a coil support section extending along a longitudinal axis;
   a plunger within the valve body and extending at least partially through the flux collar support section and the coil support section; and
   a flux collar mounted on the flux collar support section of the valve body;
   wherein the plunger extends at least partially through the flux collar; and
   wherein a distance between the flux collar and the plunger varies around an inner perimeter of the flux collar.

2. The valve of claim 1, wherein the flux collar support section of the valve body comprises an annular wall having a plurality of longitudinal ribs.

3. The valve of claim 2, wherein the ribs extend radially outwardly from the annular wall of the flux collar support section of the valve body.

4. The valve of claim 2, wherein the inner perimeter of the flux collar comprises an annular inner wall having a plurality of longitudinal grooves spaced to receive the ribs.

5. The valve of claim 4, wherein the port section, the flux collar support section, and the coil support section of the valve body comprise a unitary structure; wherein the flux collar comprises a multi-section ring; and wherein each section of the flux collar includes at least one longitudinal groove configured to receive one of the ribs.

6. The valve of claim 5, wherein the flux collar comprises a two-section ring; wherein the sections of the flux collar interface along a plane; and wherein the ribs extend from the annular wall of the flux collar support section of the valve body in a direction perpendicular to the plane.

7. The valve of claim 1, wherein the flux collar support section of the valve body comprises an annular inner wall and an outer wall having at least two flat sides.

8. The valve of claim 7, wherein the inner perimeter of the flux collar comprises an inner wall having at least two flat sides corresponding to the flat sides of the outer wall of the flux collar support section of the valve body.

9. The valve of claim 1, wherein the flux collar support section of the valve body comprises an annular inner wall and a plurality of lobes extending radially outwardly therefrom.

10. The valve of claim 9, wherein the inner perimeter of the flux collar comprises an inner wall having a contour matching a contour of an outer wall of the flux collar support section of the valve body.

11. The valve of claim 1, wherein the flux collar support section of the valve body comprises a plurality of longitudinal ribs.

12. The valve of claim 11, wherein an inner perimeter of the flux collar comprises an annular inner wall having a plurality of longitudinal grooves spaced to receive the ribs.

13. The valve of claim 12, wherein the annular inner wall of the flux collar is flush with an inner wall of the coil support section of the valve body.

14. The valve of claim 1, wherein the coil support section of the valve body comprises an annular wall having a constant thickness; wherein the flux collar support section of the valve body comprises an annular wall having a variable thickness; and wherein the variable thickness of the flux collar support section is less than the constant thickness of the coil support section around at least a portion of the flux collar support section of the valve body.

15. The valve of claim 1, wherein the flux collar support section of the valve body has a variable thickness that varies around the flux collar support section of the valve body.

16. The valve of claim 15, wherein the coil support section of the valve body has a constant thickness; and wherein the variable thickness of the flux collar support section of the valve body is thinner than the constant thickness of the coil support section of the valve body around at least a portion of the flux collar support section.

17. The valve of claim 16, wherein the variable thickness of the flux collar support section of the valve body is thicker than the constant thickness of the coil support section of the valve body around at least a portion of the flux collar support section.

18. A valve body comprising:
   a port section, a flux collar support section, and a coil support section extending along a longitudinal axis;
   wherein the port section, the flux collar support section, and the coil support section of the valve body comprise a unitary injection molded structure; and
   wherein the flux collar support section of the valve body has a variable thickness that varies around the flux collar support section of the valve body.

19. The valve of claim 18, wherein the coil support section of the valve body has a constant thickness around the coil support section of the valve body; and wherein the variable thickness of the flux collar support section of the valve body is thinner than the constant thickness of the coil support section of the valve body around at least a portion of the flux collar support section.

20. The valve of claim 19, wherein the variable thickness of the flux collar support section of the valve body is thicker than the constant thickness of the coil support section of the valve body around at least a portion of the flux collar support section.

* * * * *